United States Patent [19]
Nurse, Jr.

[11] Patent Number: 5,593,584
[45] Date of Patent: Jan. 14, 1997

[54] SEPTIC TANK FILTER

[76] Inventor: Harry L. Nurse, Jr., 10409 Watterson Trail, Louisville, Ky. 40299

[21] Appl. No.: 436,103

[22] Filed: May 8, 1995

[51] Int. Cl.$^6$ ................................................ B01D 29/39
[52] U.S. Cl. ..................... 210/346; 210/486; 210/487; 210/532.2
[58] Field of Search ................................... 210/346, 486, 210/487, 497.01, 532.1, 532.2

[56] References Cited

U.S. PATENT DOCUMENTS

| | | | |
|---|---|---|---|
| 2,822,926 | 2/1958 | Walton et al. | 210/486 |
| 2,900,084 | 8/1959 | Zabel. | |
| 3,034,656 | 5/1962 | Kasten | 210/487 |
| 3,332,552 | 7/1967 | Zabel. | |
| 4,439,323 | 3/1984 | Ball. | |
| 4,710,295 | 12/1987 | Zabel. | |
| 4,832,846 | 5/1989 | Gavin | 210/532.2 |
| 5,264,120 | 11/1993 | Graves | 210/532.2 |
| 5,382,357 | 1/1995 | Nurse. | |

Primary Examiner—W. L. Walker
Attorney, Agent, or Firm—Middleton & Reutlinger; Charles G. Lamb

[57] ABSTRACT

A filter unit for a septic tank including a cylindrical filter housing having two chambers therein, a first chamber having a plurality of stacked disc-dam filter units and a second chamber. Each disc-dam filtering unit is provided with an upstream side and a downstream side and the cylindrical housing has an opening in the bottom thereof in flow communication with the upstream side of the disc-dam filtering units. A vertically extending partition is provided to separate the first chamber from the second chamber and the partition includes flow-through openings therethrough of preselected size for controlling the rate of flow from the downstream side of the disc-dam units into the second chamber.

6 Claims, 3 Drawing Sheets

SEPTIC TANK FILTER

BACKGROUND OF THE INVENTION

The present invention relates to filter units for septic tank systems and more particularly to a filter unit for use in a septic tank having a controlled rate of waste water discharge.

There have been proposed and utilized a number of different filtering devices for separating solid matter from waste water in septic tanks. Most of the devices for removing waste water from septic tanks provide means for allowing the solid materials to settle to the bottom of the tank wherein the solid materials digest by reaction with bacteria. The by-products of the reaction with the bacteria then pass through filtration means to remove the remaining relatively small particles therefrom with the waste water being removed by overflow or by discharge pumps into a drain field.

Two particular useful types of filter units presently in use in septic tank systems are taught in U.S. Pat. No. 3,332,552 and U.S. Pat. No. 4,710,295. Filter units described in these two patents include a filter housing unit disposed within a septic tank wherein the filter housing unit has an open bottom and a plurality of stacked disc-dam type filter units wherein the upstream side of each disc-dam unit is in flow communication with upward flowing waste water and the downstream side of the dams in each filter unit is in flow communication with a waste water discharge from the housing and in turn the septic tank. Spacing between the upper surface of a dam on one disc and the lower planar surface of an adjacent-above disc defines a flow through slot for passing the waste water over the dam. This spacing between the upper surface of a dam and the lower surface of an adjacent vertically above disc determines the particle size of solid materials which will not pass through the dam from the upstream to the downstream side.

SUMMARY OF THE INVENTION

An object of the present invention is to provide a filter device for separating solids from liquids.

Another object of this invention is to provide a filter device for use in a waste water treatment device for a septic tank.

Even another object of this invention is to provide a filter device having improved means for controlling the rate of effluent from the filtering unit into a discharge line in a drain field.

More particularly, the present invention provides a filter device for separating solid material from a liquid, comprising:

a cylindrical housing having two chambers therein, a first chamber having a plurality of stacked disc-dam filtering units and a second chamber in flow communication with a liquid downstream side of said stacked disc-dam units and a liquid discharge means from said housing;

said housing having an open bottom in flow communication with said first chamber; and, a partition separating said first chamber from said second chamber, said partition including flow-through openings therethrough of preselected size to control the rate of flow of liquid through said partition.

Briefly, the present invention provides a filter device useful in continuous separation of solid matter from a liquid, such as waste water, and particularly a filter device disposed within a waste water treatment device or septic tank. The location of the filter device is disposed within the upper portion of the septic tank but within the normal level of the waste water. The filtering device includes a housing separated into two compartments wherein a first compartment includes a plurality of disc-dam filter units stacked therein and the second compartment is in flow communication with the downstream side of the disc-dam filter units and a discharge conduit or opening in the housing for the flow of waste water from the housing into a drain field. The housing is provided with an opening in the bottom in flow communication with the first chamber so that waste water flows upward through the first chamber and across the dams in the disc-dam filter units to the downstream side of the filter units and into the second chamber. Spacing between the lower surface of the disc and the upper surface of the dams on each disc is of a preselected size to prevent large particles of solid materials in the water passing across the dams. The improvement in the present invention is a partition disposed between the first chamber and the second-chamber with openings therein of preselected size to control the flow of liquids from the first chamber to the second chamber. Generally, the openings in the partition include a plurality of slots or pores therethrough wherein the total cross-sectional area of the openings increase with the vertical height of the partition. That is, at a lower vertical position of the partition, the cross-sectional area of the flow-through openings is less than the cross-sectional area of the openings at a higher vertical position of the partition.

Further objects and advantages of this invention will appear to those skilled in the art from the following description and appended claims, reference being had to the accompanying drawings forming a part of the specification wherein like reference characters designate corresponding parts into several views.

DETAILED DESCRIPTION OF THE PREFERRED EMBODIMENTS

Figure 1:
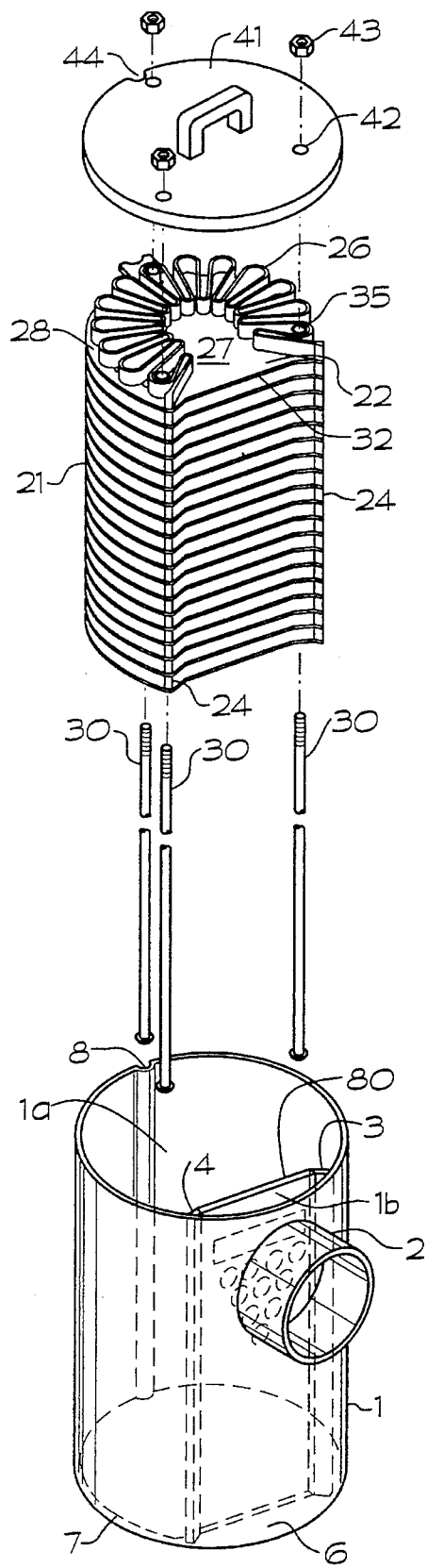
FIG. 1 is an exploded, perspective view of one preferred embodiment of a filter assembly of the present invention.

Referring to FIG. 1, a housing 1 is provided with a first chamber denoted by the numeral 1a and a second chamber denoted by the numeral 1b separated by a vertically extending partition 80. The housing 1 may be made of any suitable material, such as a plastic, including polyethylene, polypropylene or the like and the outlet can be, for example, a female or male connection for connection to a cooperative outlet (not shown).

Longitudinally extending seal members 3 and 4 are provided within housing 1 to extend generally the length of the housing, as shown, for engaging the filter unit as described hereinafter. The longitudinally extending seal members 3 and 4 may be unitary with the longitudinally extending partition 80 or may be in abutment with a movable partition 80 as shown in FIG. 1.

Figure 6:
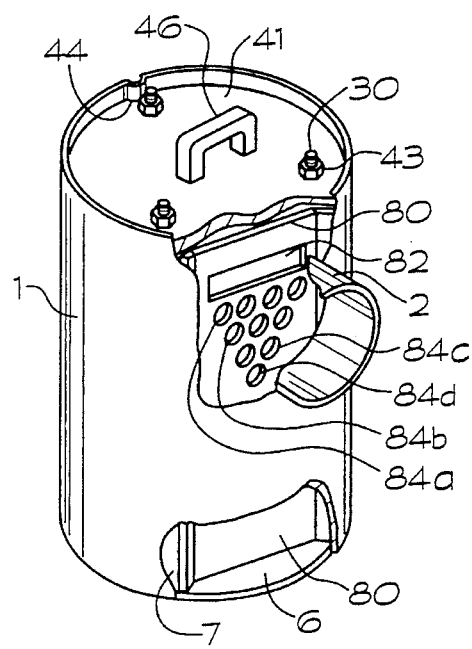
FIG. 6 is a perspective view of the filter assembly in FIG. 1 in assembled form with selected portions cut-away; and, FIG. 7 is a view of the filter assembly positioned within a septic tank.
Figure 2:
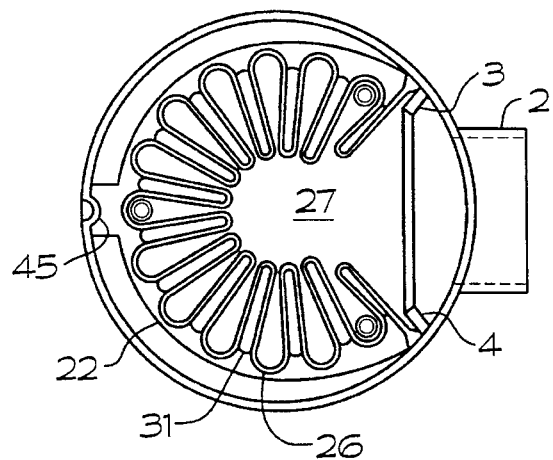
FIG. 2 is a top view of the assembly shown in FIG. 1.

The housing 1 is generally cylindrical in shape and includes a lip 6, as best shown in FIG. 6, extending across a chord of the circular cross-section at the bottom of housing 1 providing an opening 7 which, in operation, is located within the septic tank 71 (FIG. 7) and adapted to permit the upward flow of sewage into the housing 1. A lobe 8 is provided along one longitudinal edge of housing 1 to receive cooperating notches in the filter discs 22, as described hereinafter, to align the filter discs 22 within the housing 1. The filter unit 21 includes a plurality of filter discs 22 of generally circular cross-section with a chord section 23 cut, as shown, where lips 24 are provided, also as shown, to engage seal members 3 and 4 in particular and in some cases the partition 80. The partition 80 may be, in some cases, spaced from the filter discs 22. As described hereinafter and more particularly in U.S. Pat. No. 4,710,295 and U.S. Pat. No. 3,332,552 each of the discs 22 is provided with an elongated sinuous over-flow dam 26 which extends from one of the edges 24 to the other edge 24 in a serpentine path on top of the disc 22. There is one strip 26 on each disc 22 and the strips 26 extend vertically upward from the upper surface of the discs 22. Each disc 22 is divided into two portions. Portion 27 on one side of the dam 26 forms an outlet while the portion 28 on the opposite side of the dam 26 forms an inlet for each of the discs 22. As shown in FIG. 2, slots 31 are provided between the turns of the dam members 26 to permit solid particulates or ash to return downwardly and out through the inlet 7 of the housing 1, as described hereinafter.

Figure 4:
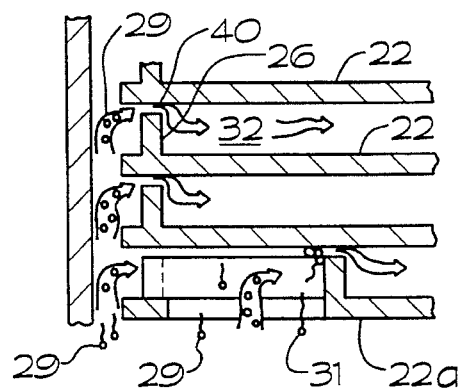
FIG. 4 is a segmental view showing a method of operation of the filter unit shown in FIG. 1.

As shown in FIG. 4, fluid flows over a dam member 26 into a chamber 32 defined by portion 27 and the lower surface of an above disc 22 so that clean fluid is emitted to chamber 32 while the particulate matter 29 carried in the fluid falls out, as shown, as the liquid passes through the space 40 which is defined between the upper surface of the dam member 26 and the lower surface or underside of the vertically adjacent discs 22 spaced vertically above. The bottom-most plate or disc identified by the numeral 22a in FIG. 4, illustrates the flow of liquid through one of the slots 31 (FIG. 2) and the removal of particles 29 therefrom.

Figure 5:
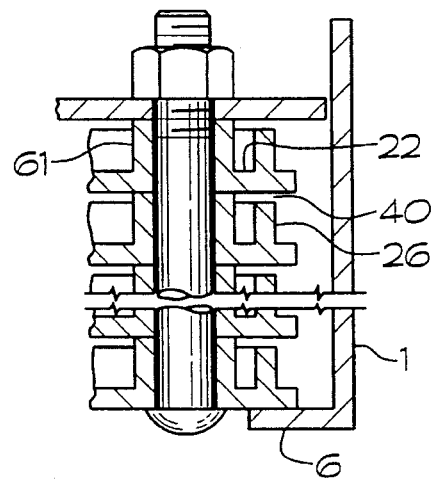
FIG. 5 is a segmental view of the orientation of disc-dams in an assembled unit of FIG. 1.

Referring again to FIG. 1, it will be seen that the entire filter assembly can be mounted onto rods 30 which extends longitudinally through holes 35 provided within each of the discs 22. Cover 41 can also be provided with apertures 42 therein to receive the rods 30 therethrough while nuts 43 can be provided to secure the lid or cover 41 to the disc 22. A notch 44 is provided in lid 41 and a cooperative notch 45 is provided within each of the discs 22, as shown in FIG. 2, to receive the lobe 8 as previously described. The size of the particulate matter to be removed and the size to be allowed to pass over the dams 26 is determined by the spacing 40 between the bottom of a disc 22 and the top of a dam 26, as shown in FIG. 5. FIG. 5 also shows the bottom-most disc 22 located on the lip 6 of the housing 1. And, the spacing between discs 22 is determined by the height of post 61 as shown and thus the clearing of 40 is between the top of a disc-dam 26 and the bottom of the next vertically-above adjacent disc 22. Openings or slots 31 and the spacings 40 are selected to provide minimal disturbance of the material flowing through the device so that there is little breakup of the solids and the larger solids are returned to the tank for further digestion. In the event of a stagnant condition where the space 40 between the top of the dam 26 and the bottom of the next adjacent plate 22 becomes clogged, the liquid level simply rises higher and utilizes the next highest level of filter area until the clogging condition normally cures itself.

Figure 3:
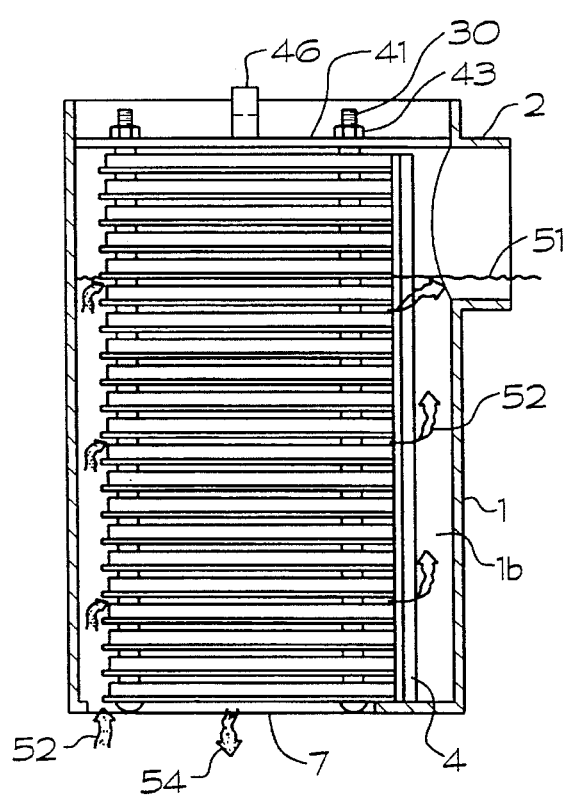
FIG. 3 is a side elevational view, in section, of the arrangement shown in FIG. 1, in assembled form.
Figure 7:
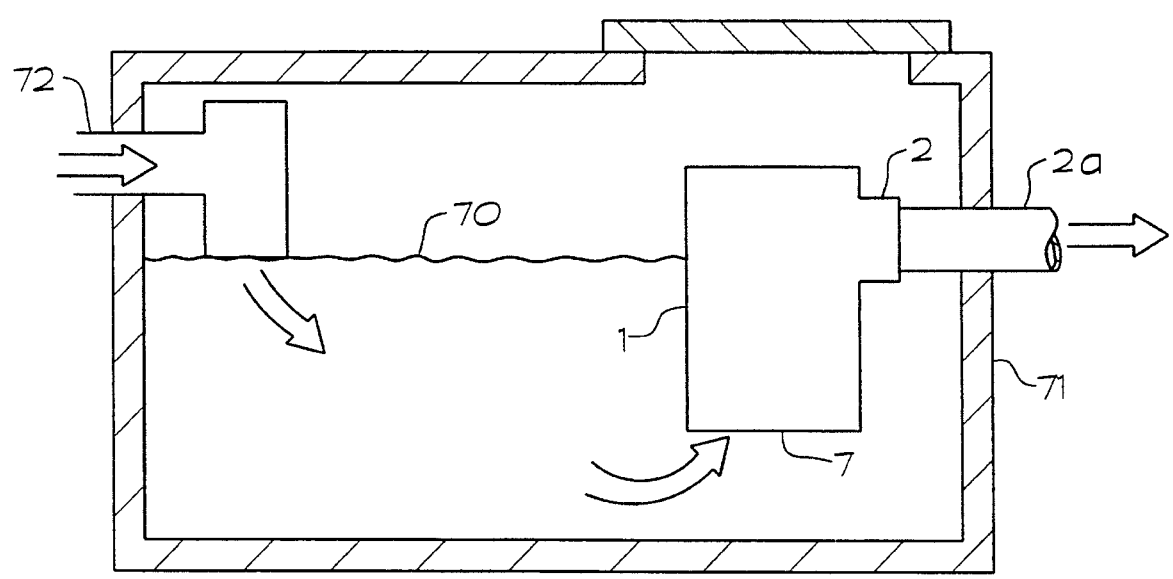

It will be understood that when the filtering unit, shown in FIG. 1, is completely assembled with the rods 30 extending through the length of the stacked discs 22 and the lid 41 is attached thereto, the entire unit is located in the filter body 1. As shown in FIG. 3, a handle 46 extends upwardly from lid 41 so the unit can then be simply removed from the housing 1 or can be permanently implanted into a septic system as shown in FIG. 7. In FIG. 3 the level of waste water 51 is shown in the outlet 2 where a clear liquid is shown being emitted from the second chamber 1b and the fluid 52, whereas the particulate matter is shown falling back into the septic tank through opening 7 as shown by arrow 54, and the particulate matter (ash) falls to the bottom of the tank for further digestion.

Referring again to FIG. 1 and FIG. 6, partition 80 divides the housing 1 into a first chamber denoted by the numeral 1a and the second chamber denoted by the numeral 1b. As best shown in FIG. 6, the partition 80 includes a plurality of openings therethrough for the passage of waste water from the first chamber 1a to the second chamber 1b. As shown, the openings in the partition 80 include overflow slot 82 which is generally positioned in the partition 80 in alignment with the outlet 2 and a plurality of rows of openings 84 disposed vertically downward from the overflow slot 82. The openings 84 are generally aligned in horizontal rows with the flow-through area of the openings being in ascending flow-through area from the bottom to the top. As shown, row 84a is the top row and includes four flow-through openings therethrough of a preselected size. Vertically beneath the first row 84a of flow-through openings 84 is a second row 84b of openings, three being shown in this row, wherein each flow-through opening is approximately of the same cross-sectional area as each flow-through opening in row 84a. Vertically below the second row 84b of openings is a third row of openings, two being shown, identified by the numeral 84c. Again, each opening in row 84c is of the same cross-sectional flow-through area as each opening in rows 84a and 84b. At the bottom most portion of the flow-through openings 84 is a single opening identified by the numeral 84d. Opening 84d is of approximately the same flow-through area as each of the openings in the aforementioned rows of openings 84a, 84b, and 84c. Thus, as the liquid builds up in the first chamber 1a, the flow from chamber 1a into chamber 1b increases in flow as the level rises. If the level in chamber 1a extends above the openings in row 84a, then the slot 82, which is in alignment with the outlet 2, allows for the overflow or the removal of a large quantity of liquid from chamber 1a. Even though the openings 84 in each row 84a-84d is of the same flow-through area, it is realized that openings 84 may be of varying cross-sectional area. The criteria is that the total flow-through area is in an ascending flow-through rate from bottom to top. Moreover, the total flow-through cross-sectional area of over-flow slot 82 and openings 82 and 84 is generally greater than the flow-through cross-sectional area of outlet 2.

As shown in FIG. 7, septic tank 71 includes an opening on one side thereof to receive an inlet conduit 72 for the introduction of waste treatment into the unit and an opening in the opposite side thereof to receive a conduit 2a therethrough for the removal of the filtered waste water from the septic tank. The normal level of waste water in a tank is just below the inlet 72 and the outlet 2a, the level of sewage in the septic tank being identified by the numeral 70.

In the operation of the preferred embodiment, waste water including particles of solid matter therein, rises through the opening 7 in the housing 1 and flows across the dams 26, the spaced discs 22 and into the discharge or second chamber 1b. The partition 80 limits the flow of waste water from a lower liquid level at a relatively low rate thereby providing for a low flow rate of waste water through the filtering units. By limiting the flow of liquid through the lower filter units provides for more settling time for the particulates as they flow upwards through the housing 1 thereby increasing the filtration rate of the waste water through the filter assembly.

It is realized that various changes may be made by those skilled in the art without departing from the spirit and scope of the invention as expressed in the claims appended hereto.

What is claimed is:

1. A filter unit comprising:
   a cylindrical housing having two chambers therein, a first chamber having a plurality of stacked disc-dam filtering units with a liquid upstream side and a liquid downstream side, and a second chamber in flow communication with said liquid downstream side of said stacked disc-dam units and a liquid discharge means from a side of said housing;
   said housing having an opening in the bottom thereof in flow communication with said first chamber; and,
   a partition separating said first chamber from said second chamber, said partition including flow-through openings therethrough of preselected size to control the rate of flow from said first chamber to said second chamber.
2. The filter unit of claim 1 wherein said partition includes a plurality of horizontally extending rows of openings wherein the total flow-through area of openings in the lower rows are less than the total flow-through area of the openings in vertically ascending rows.
3. The filter unit of claim 1 wherein said partition includes an over-flow opening in horizontal alignment with said liquid discharge means, said over-flow opening and said flow-through openings are of a total cross-sectional area greater than the flow-through cross-sectional area of said liquid discharge means.
4. In a filter unit for use in a cylindrical housing having a plurality of stacked disc-dam filtering units, each of said disc-dam filtering units having an upstream side and a downstream side, said housing having an opening in a bottom in flow communication with the upstream side of each disc-dam filtering unit and a discharge in a side in flow communication with the downstream side of each disc-dam filtering unit, the improvement comprising:
   a vertically extending partition disposed between the stack of disc-dam filtering units and the discharge from said housing, said partition having a plurality of openings therethrough at preselected locations to control the rate of flow through said housing.
5. The filter unit of claim 4, said partition having a progressive cross-sectional area increase in flow-through area from a bottom of said partition to a top of said partition.
6. The filter unit of claim 4 including an over-flow opening adjacent said discharge from said filter housing, said over-flow opening and said flow-through openings being of a total cross-sectional area greater than the flow-through cross-sectional area of said discharge.

* * * * *